United States Patent
Liu et al.

(10) Patent No.: US 9,984,155 B2
(45) Date of Patent: May 29, 2018

(54) INLINE DISCUSSIONS IN SEARCH RESULTS AROUND REAL-TIME CLUSTERINGS

(75) Inventors: Sean Liu, Sunnyvale, CA (US); David Yen, San Francisco, CA (US); Sagar Kamdar, Redwood City, CA (US); Kumar Mayur Thakur, West Orange, NJ (US); Yihua Wu, Princeton Junction, NJ (US); Anthony S. Hyatt, Forest Hills, NY (US)

(73) Assignee: Google LLC, Mountain View, CA (US)

( * ) Notice: Subject to any disclaimer, the term of this patent is extended or adjusted under 35 U.S.C. 154(b) by 839 days.

(21) Appl. No.: 13/490,779

(22) Filed: Jun. 7, 2012

(65) Prior Publication Data
US 2013/0332479 A1  Dec. 12, 2013

(51) Int. Cl.
*G06F 17/30* (2006.01)

(52) U.S. Cl.
CPC .............................. *G06F 17/30864* (2013.01)

(58) Field of Classification Search
CPC ......... G06F 17/30861; G06F 17/30864; G06F 17/30867; G06F 17/30017; G06F 17/30657; G06F 17/30634
See application file for complete search history.

(56) References Cited

U.S. PATENT DOCUMENTS

| 8,712,952 | B2* | 4/2014 | Soulie-Fogelman | G06Q 50/01 706/52 |
| 8,738,466 | B1* | 5/2014 | Kirby | G06F 17/30864 705/26.5 |
| 8,856,121 | B1* | 10/2014 | Makki | G06F 17/30861 707/736 |
| 9,189,526 | B1* | 11/2015 | Chen | G06F 17/3053 |
| 9,325,755 | B1* | 4/2016 | Abercrombie, III | H04L 65/403 |
| 9,336,333 | B2* | 5/2016 | Blue | G06F 17/30864 |
| 9,342,584 | B2* | 5/2016 | Nagasaka | G06F 17/30634 |
| 9,454,519 | B1* | 9/2016 | Keysers | G06F 17/241 |
| 2008/0140650 | A1* | 6/2008 | Stackpole | G06F 17/3087 |

(Continued)

FOREIGN PATENT DOCUMENTS

WO  WO2011011398 A3  4/2011

OTHER PUBLICATIONS

International Search Report and Written Opinion, International Application No. PCT/US2013/044273, dated Sep. 26, 2013, 9 pages.

(Continued)

*Primary Examiner* — Ashish K Thomas
*Assistant Examiner* — Rezwanul Mahmood
(74) *Attorney, Agent, or Firm* — Fish & Richardson P.C.

(57) ABSTRACT

Methods, systems, and apparatus, including computer programs encoded on a computer storage medium, for receiving a search query, identifying a plurality of search results that are responsive to the search query, the plurality of search results including a plurality of items of digital content distributed using one or more social networking services, and determining that one or more terms provided in the search query is an active keyword and, in response: defining a first sub-set of items, the first sub-set of items including items of the plurality of items of digital content and being responsive to the active keyword, and providing items in the first sub-set of items for display as a discussion stream within search results.

14 Claims, 5 Drawing Sheets

(56) References Cited

U.S. PATENT DOCUMENTS

| | | | |
|---|---|---|---|
| 2008/0228947 A1* | 9/2008 | Markus | G06F 17/30864 709/217 |
| 2009/0031232 A1* | 1/2009 | Brezina | H04M 15/00 715/764 |
| 2009/0125511 A1* | 5/2009 | Kumar | G06Q 10/107 |
| 2009/0327263 A1 | 12/2009 | Maghoul | |
| 2010/0174709 A1 | 7/2010 | Hansen et al. | |
| 2010/0228744 A1* | 9/2010 | Craswell | G06F 17/30905 707/751 |
| 2010/0293185 A1* | 11/2010 | Rosado | G06F 17/3089 707/769 |
| 2011/0087647 A1* | 4/2011 | Signorini | G06F 17/30867 707/709 |
| 2011/0173569 A1* | 7/2011 | Howes | G06F 17/30902 715/835 |
| 2011/0191314 A1* | 8/2011 | Howes | G06F 17/30864 707/706 |
| 2011/0264648 A1* | 10/2011 | Gulik | G06F 17/30867 707/722 |
| 2011/0320423 A1* | 12/2011 | Gemmell | G06F 17/30867 707/706 |
| 2012/0015693 A1* | 1/2012 | Choi | H04M 1/72566 455/566 |
| 2012/0023390 A1* | 1/2012 | Howes | G06F 17/30864 715/205 |
| 2012/0030123 A1* | 2/2012 | Ocko | A63F 13/12 705/304 |
| 2012/0059820 A1* | 3/2012 | Lakshmanan | G06F 17/30867 707/723 |
| 2012/0109836 A1* | 5/2012 | Chen | H04W 4/21 705/319 |
| 2012/0117059 A1* | 5/2012 | Bailey | G06Q 50/01 707/723 |
| 2012/0151383 A1* | 6/2012 | Kazan | G06Q 10/101 715/753 |
| 2012/0166452 A1* | 6/2012 | Tseng | G06F 17/30867 707/749 |
| 2012/0254307 A1* | 10/2012 | Jeong | G06Q 50/01 709/204 |
| 2013/0036109 A1* | 2/2013 | Kulick | G06Q 10/10 707/722 |
| 2013/0060744 A1* | 3/2013 | Roychoudhuri | G06F 17/30867 707/706 |
| 2013/0103686 A1* | 4/2013 | Sisneros | G06F 17/30867 707/736 |
| 2013/0167041 A1* | 6/2013 | Huang | G06F 3/0485 715/753 |
| 2013/0179429 A1* | 7/2013 | Archambault | G06Q 30/0631 707/711 |
| 2013/0298038 A1* | 11/2013 | Spivack | H04L 65/403 715/753 |
| 2013/0304818 A1* | 11/2013 | Brumleve | H04L 67/02 709/204 |
| 2013/0332479 A1* | 12/2013 | Liu | G06F 17/30864 707/769 |
| 2014/0074629 A1* | 3/2014 | Rathod | G06Q 10/10 705/14.73 |
| 2015/0046371 A1* | 2/2015 | Leary | G06Q 30/0282 705/347 |

OTHER PUBLICATIONS

International Preliminary Report on Patentability for International Application No. PCT/US2013/044273, dated Dec. 18, 2014, 6 pages.

* cited by examiner

INLINE DISCUSSIONS IN SEARCH RESULTS AROUND REAL-TIME CLUSTERINGS

BACKGROUND

This specification relates to generating search results.

Search engines aim to identify resources (e.g., images, audio, video, web pages, text, documents) that are relevant to a user's needs and to present information about the resources in a manner that is most useful to the user. Search engines return a set of search results in response to a user submitted query.

SUMMARY

In general, innovative aspects of the subject matter described in this specification can be embodied in methods that include actions of receiving a search query, identifying a plurality of search results that are responsive to the search query, the plurality of search results including a plurality of items of digital content distributed using one or more social networking services, and determining that one or more terms provided in the search query is an active keyword and, in response: defining a first sub-set of items, the first sub-set of items including items of the plurality of items of digital content and being responsive to the active keyword, and providing items in the first sub-set of items for display as a discussion stream within search results. Other implementations of these aspects include corresponding systems, apparatus, and computer programs recorded on computer storage devices, each configured to perform the operations of the methods.

These and other implementations can each optionally include one or more of the following features: actions further include, in response to determining that one or more terms provided in the search query is an active keyword: defining a second sub-set of items, the second sub-set of items comprising items of the plurality of digital content that are different than items provided in the first sub-set of items, and providing items in the second sub-set of items for display outside of the discussion stream; the active keyword is associated with an event; each item in the first sub-set of items is determined to be relevant to the event; an item in the first sub-set of items is determined to be relevant to the event based on at least one of a time at which the item was distributed using the one or more social networking services and a context of the item; actions further include defining a set of items from the plurality of items of digital content based on at least one of an access authorization of a searching user with respect to each item of the plurality of items of digital content and respective item scores associated with items of the plurality of items of digital content; the first sub-set of items comprises a sub-set of the set of items; each item score is specific to the searching user such that items included in the set of items are potentially more relevant to the searching user than other items provided in the plurality of items of digital content; the searching user includes a user that submitted the search query; providing items in the first sub-set of items for display includes sending a user interface document, the user interface document including instructions to display the items of the first sub-set of items as the discussion stream; the user interface document includes a web page; actions further include providing a content sharing interface within the discussion stream, the content sharing interface enabling a searching user to contribute items of digital content to the discussion stream; actions further include: receiving an item of digital content authored by the searching user using the content sharing interface, including the item of digital content in the first sub-set of items, and updating the search results such that the item of digital content is displayed in the discussion stream; and determining that one or more terms provided in the search query is an active keyword includes: comparing each term of the one or more terms to a plurality of active keywords provided in an active keyword database, the plurality of active keywords including the active keyword, and determining that a term of the one or more terms matches the active keyword.

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

Implementations of the present disclosure are generally directed to providing real-time search results including discussions from one or more social networking services, the discussions being displayed inline with other search results. More particularly, implementations of the present disclosure are directed to generating search results that include one or more items of digital content distributed using one or more social networking services based on one or more active keywords included in a search query. Implementations are further directed to displaying the one or more items of digital content as an inline discussion displayed within a search results page. Implementations further include enabling social interaction with the items of digital content inline with the other search results. Implementations further include updating the search results in real-time based on such interactions.

In some implementations, a searching user can submit a search query to a computer-implemented searching service. The searching service can provide search results responsive to the search query, the search results including social search results. In some implementations, it is determined that the search query includes one or more active keywords. In some examples, and as discussed in further detail herein, an active keyword includes a search term that is frequently submitted within a predetermined time period, and/or a search term that indicates an occurrence of an event. In some examples, the occurrence of the event can be concurrent with submission of the search query. In some examples, and in response to determining that the search query includes one or more active keywords, one or more items of digital content can be identified as social search results responsive to the search query for inclusion as an inline discussion within the search results. In some examples, the one or more items of digital content include digital content distributed by one or more users of one or more social networking services.

The search results can be displayed in a search results page. In some examples, the one or more items of digital content can be displayed as a social networking service discussion inline with other search results that are responsive to the search query. In some examples, the inline discussion can be provided as a discussion stream that includes a graphically displayable collection of items that have been distributed to and/or from, or are otherwise accessible by the searching user, who is a user of a social networking service. In some examples, the searching user can directly interact with the social search results (e.g., comment on, endorse and/or re-share an item of digital content). In some examples, a content sharing interface can be provided inline with the social search results to enable the searching user to generate an item of digital content that might be topical to the displayed social search results.

In some implementations, the social search results are updated in real-time in response to interaction of the searching user with the social search results. In some examples, and in response to the searching user interacting with an item of digital content and/or generating digital content using the content sharing interface, the social search results can be updated to reflect the interaction. For example, users can be identified as contacts of themselves within an underlying social networking service. Consequently, interactions of the searching user can be surfaced to the searching user in the social search results.

Further details of implementations of the present disclosure are provided herein with reference to an example search system and an example social networking service. It is appreciated, however, that implementations of the present disclosure can be realized using any appropriate search system and/or social networking service.

Figure 1:
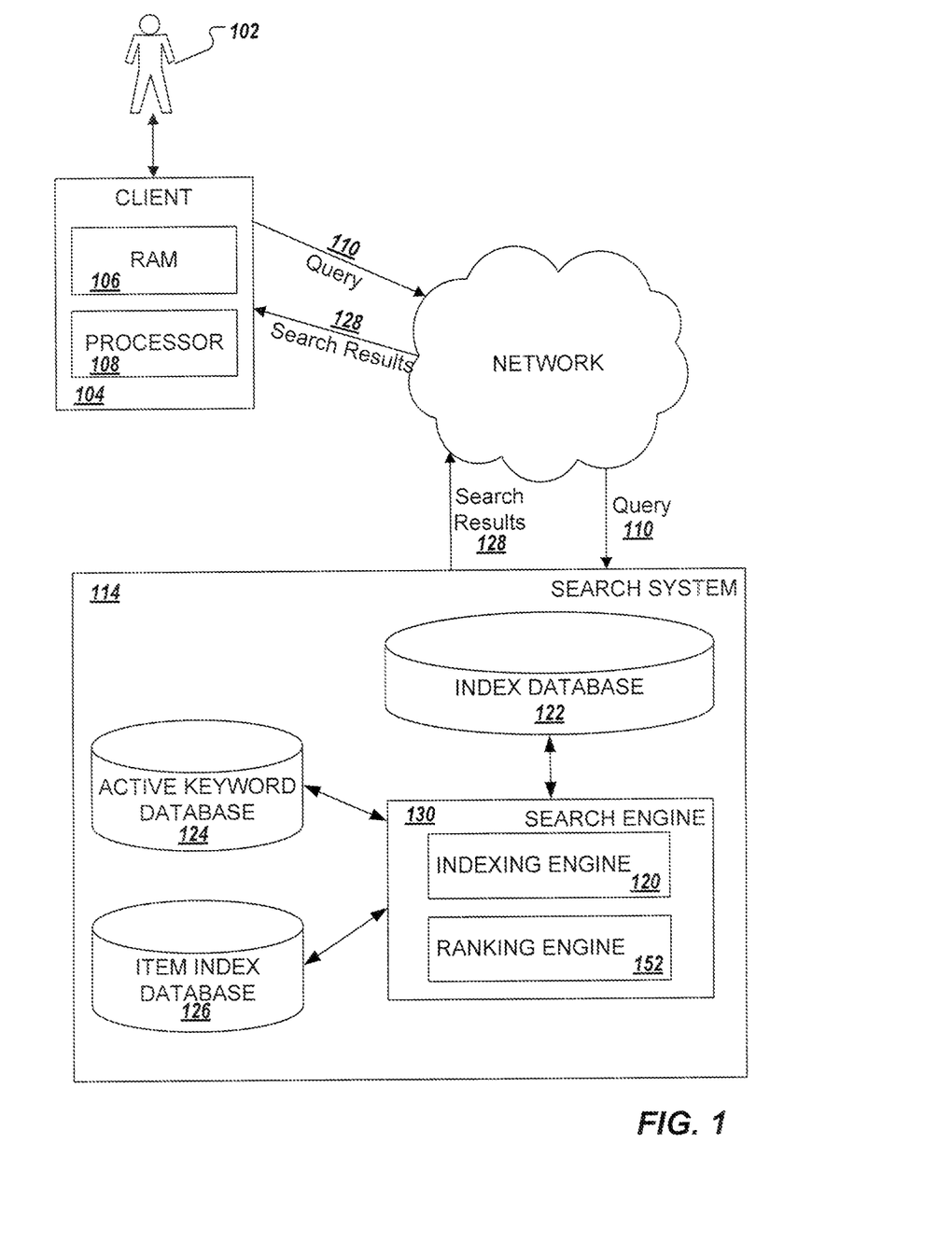
FIG. 1 depicts an example search system.

FIG. 1 illustrates an example search system 114 for providing search results (e.g., hyperlinks, images, documents, videos, and/or multimedia content) that are relevant to submitted queries as can be implemented in an Internet, an intranet, or other client and server environment. The search system 114 is an example information retrieval system. In some implementations, the search system 114 is specialized to search particular kinds of content. In other implementations, the search system 114 searches content in general.

A user 102 interacts with the search system 114 through a client 104. For example, the client 104 can be or can include a computing device (e.g., a personal computer, a laptop computer, a tablet computing device, a smartphone or any other appropriate computing device or combinations thereof) coupled to the search system 114 through a wired or wireless local area network (LAN) or wide area network (WAN), e.g., the Internet.

The user 102 submits a query 110 to a search engine 130 within the search system 114. When the user 102 submits a query 110, the query 110 is transmitted through a network to the search system 114. The search system 114 can be implemented as, for example, one or more computer programs running on one or more computers in one or more locations that are coupled to each other through a network. In some implementations, the search system 114 includes an index database 122, an active keyword database 124, an item index database, and the search engine 130. The search system 114 responds to the query 110 by generating search results 128, which are transmitted through the network to the client 104 in a form that can be presented to the user 102 (e.g., as a search results user interface document (web page) displayed in a web browser running on the client 104). As described below, the search results 128 can include web search results and social search results. As also described below, the social search results can include event-associated social search results. The search engine 130 transmits the search results 128 through the network to the client 104 for presentation to the user 102.

In some implementations, when the query 110 is received at the search engine 130, the search engine 130 can identify web search results and social search results that are responsive to the query 110. In some examples, the search engine 130 includes an indexing engine 120 that indexes content found by the search system 114, such as documents (e.g., web pages, items distributed using one or more social networking services) found while crawling the Internet. The index database 122 can store index information for locating web content that can be provided in the search results. The active keyword database 124 can store information regarding one or more search terms that have been determined to be active keywords. In some examples, an active keyword can include a search term that has spiked in popularity over a pre-defined time period, and can be associated with an occurring or soon to be occurring event. In some examples, the item index database 126 can store index information for locating items of digital content that have been distributed using one or more social networking services (e.g., posts and/or status updates distributed using a social networking service) and that can be provided as social search results.

In some examples, a ranking engine 152 can be provided to rank the search results that are responsive to the query 110. In some examples, search results can be ranked based on a result score associated with a resource referenced by each search result. In some examples, the result score associated with a resource by the engine 130 can generally be a query-independent measure of the quality of the result, a query-specific measure of how well the result matches the query, or a score derived from both a query-independent measure and a query specific measure. In some implementations, the index database 122 includes multiple indices, for example, corresponding to different types of resources, and the ranking engine 152 uses different scoring functions to score different types of resources.

As noted above, implementations of the present disclosure are directed to providing social search results displayed as an inline discussion within a search results page displayed to a searching user. In some examples, the inline discussion is provided as a discussion stream that includes a graphically displayable collection of items that have been distributed to and/or from, or are otherwise accessible by the searching user, who is a user of a social networking service. In some implementations, a search query is received. One or more search results that are responsive to the query can be received. In some examples, the search results include web search results (e.g., web pages) that are responsive to the query. In some examples, the search results include social search results, the social search results including one or more items of digital content distributed using one or more social networking services. In some examples, items of digital content can include text, hyperlinks, images, videos and/or audio, and any other appropriate digital content.

In some implementations, items of digital content that are to be displayed to the searching user include items that the searching user is authorized to access. For example, an item of digital content can be distributed to a limited audience using a social networking service. If the searching user is determined to be a member of the limited audience, the item of digital content can be available to display to the searching user as a social search result. If, however, the searching user is not determined to be a member of the limited audience, the item of digital content is not made available to display to the searching user as a social search result. As another example, an item of digital content can be publicly distributed within the social networking service. Consequently, each user of the social networking service, including the searching user is allowed access to the item, and the item can be available for display as a social search result.

In some implementations, it is determined whether the search query includes one or more active keywords. For example, the search query can be parsed and each term provided in the search query can be referenced against active keywords in a database (e.g., the active keyword database 124 of FIG. 1). If at least one term of the search query matches an active keyword in the database, the search query can be determined to include one or more active keywords.

In some implementations, and in response to determining that the search query includes one or more active keywords, a first sub-set social search results and a second sub-set of social search results can be defined. In some examples, items of digital content provided in the first sub-set of social search results can include items that are determined to be relevant to an event underlying the one or more active keywords included in the search query. For example, and as discussed in further detail below, an event can include a sports match between two teams and active keywords can include the names of each team. In some examples, fans of either or both teams can distribute items of digital content using one or more social networking systems, which items of digital content can include references to one or both teams and/or the event itself. In some examples, items of digital content in the second sub-set of digital content can include items that are determined to be responsive to the search query, but are not necessarily associated with the underlying event.

In some implementations, each of the social search results can be associated with a respective item score. In some examples, whether a particular item of digital content is to be included for display (e.g., provided in either the first sub-set of social search results or the second sub-set of social search results) can be determined based on the respective items scores. In some examples, an item score can reflect a quality of the item of digital content, a status of an author of the item of digital content within the social networking service used to distribute the item of digital content, and/or a strength of relationship between the author of the item of digital content and the searching user within the social networking service. In some examples, each item score can be compared to a threshold item score and, if the item score exceeds the threshold item score, the item can be included as a social search result that is to be displayed. In some examples, a threshold number of items of digital content can be selected based on item score. For example, if X items of digital content are determined to be responsive to the search query, the X items of digital content can be put in rank order based on item score, and the highest scoring Y items can be included as social search results that are to be displayed (where Y<X).

In some examples, an item score associated with a particular item can be weighted (e.g., amplified) to improve the probability that the particular item will be included in the social search results. In some examples, if the particular item is an item that was authored by the searching user, the item score can be weighted such that the value of the item score is greater than it otherwise would be. In some examples, if the particular item is an item that was authored by a user that has a strong relationship to the searching user within the one or more social networking services, the item score can be weighted such that the value of the item score is greater than it otherwise would be. In this manner, there is a greater chance that the particular item will be included in the social search results displayed to the user.

Accordingly, an item score can be specific to the item score and the searching user. For example, a first searching user can submit a search query and an item can be identified as being responsive to the search query. A first item score associated with the item can be provided. A second searching user can submit the search query and the item can again be identified as being responsive to the search query. A second item score associated with the item can be provided. The first item score can be different than the second score. For example, the first searching user can be a close contact of the author of the item within a social networking service, while the second searching user is not a contact of the author within the social networking service. Consequently, the first item score can be greater than the second item score. In this manner, there is greater potential that the item will be provided in search results displayed to the first searching user than in search results displayed to the second searching user.

In some implementations, web search results and the social search results can be provided for display to the searching user in response to the search query. In accordance with implementations of the present disclosure, items of digital content provided in the first sub-set of social search results can be presented as a discussion stream that is displayed with other search results (e.g., the web search results and/or items of digital content of the second sub-set of digital content). In this manner, a social networking service discussion stream that is responsive to the search query and that is relevant to an event is displayed to the searching user, enabling the searching user to readily interact with other users of the social networking service. For example, the searching user can directly interact with items displayed in the discussion stream (e.g., comment on, endorse and/or re-share an item of digital content). In some examples, a content sharing interface can be provided within the discussion stream to enable the searching user to generate an item of digital content and to contribute to the discussion stream.

Figure 2:
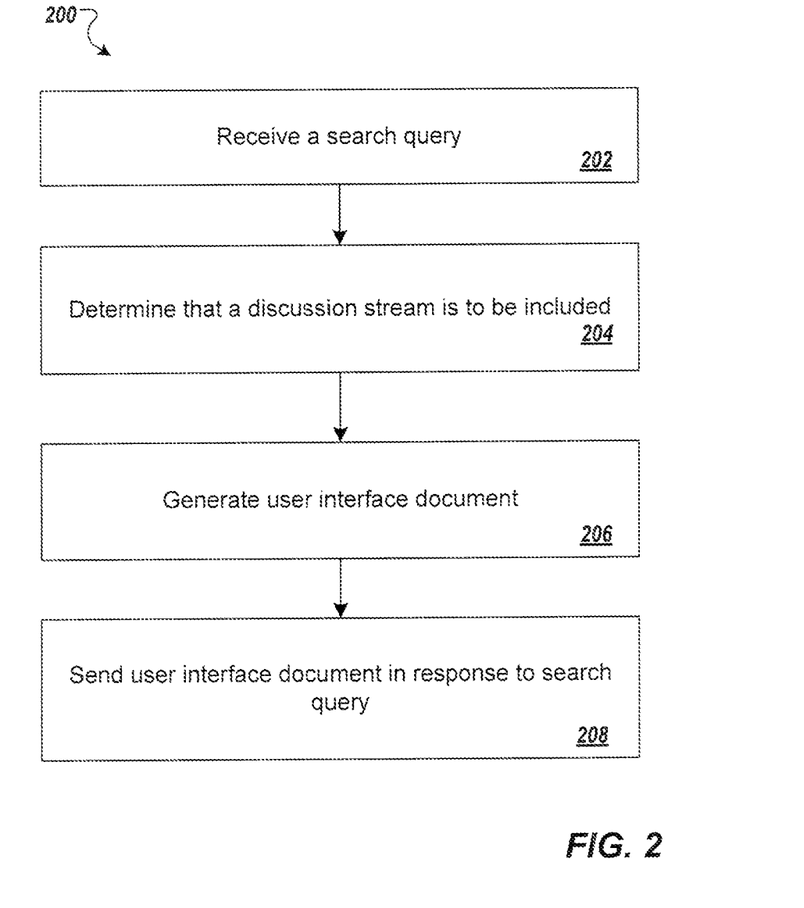
FIG. 2 depicts an example process for generating a user interface document in response to a search query.

FIG. 2 depicts an example process 200 for generating a user interface document in response to a search query. In some implementations, the example process 200 can include operations that are performed using one or more computer programs executed using one or more data processing apparatus (e.g., one or more client-side computing devices and/or one or more server-side computing devices).

A search query is received (202). For example, the user 102 of the client device 104 can submit a search query to a computer-implemented searching service, and the search query can be received by the search system 114. It is determined that a discussion stream is to be included in response to the search query (204). For example, the search system 114 can determine that a discussion stream including one or more items of digital content distributed using one or more social networking services is to be displayed in search results responsive to the search query. A user interface document is generated (206). For example, the search system 114 can generate a user interface document (e.g., a web page) that can be used to display the search results including the discussion stream. The user interface document is sent to display the search results in response to the search query (208). For example, the search system 114 can send the user interface document to the client device 104 to display the search results, including the discussion stream, to the user 102.

Figure 3:
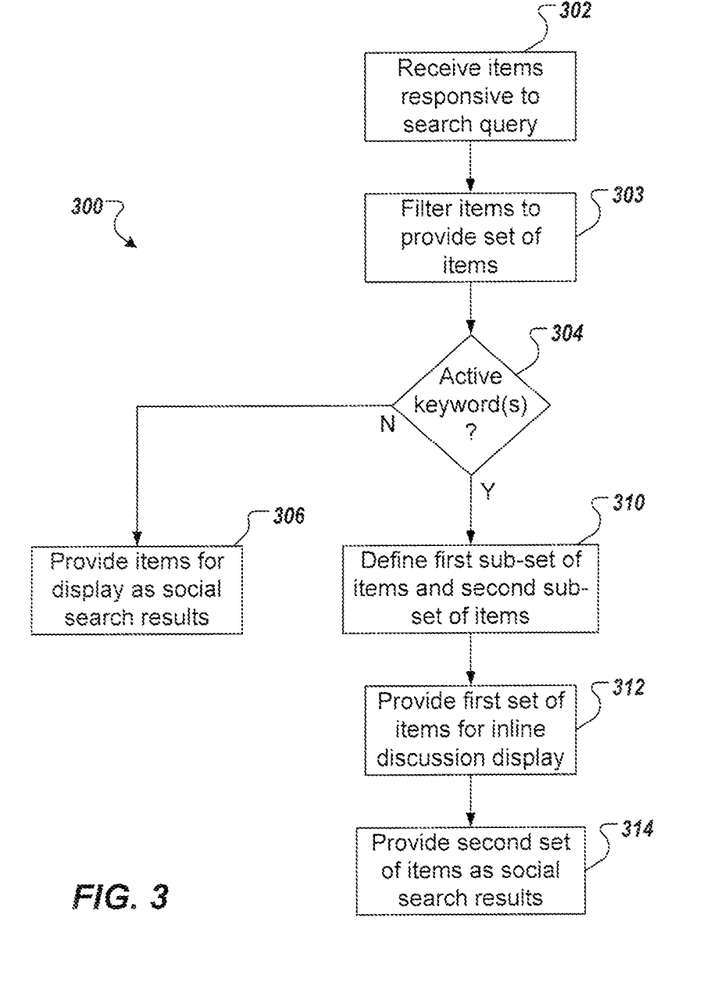
FIG. 3 depicts an example process for providing a discussion stream in search results.

FIG. 3 depicts an example process 300 for providing a discussion stream in search results. In some implementations, the example process 300 can include operations that are performed using one or more computer programs executed using one or more data processing apparatus (e.g., one or more client-side computing devices and/or one or more server-side computing devices).

Items of digital content that are responsive to the search query are received (302). For example, the search system 114 can cross-reference terms provided in the search query with the items in the item index database 126 and one or more items that are responsive to the search query can be received. The one or more items are filtered to provide a set of items that are to be displayed as social search results (303). In some examples, the one or more items can be filtered based on whether the searching user has access to particular items. For example, although a particular item might be responsive to a search query, the particular item is not included in the set of items if the searching user has not been granted access to the particular item (e.g., the searching user is not a member of a limited audience defined for the item). In some examples, the one or more items can be filtered based on respective item scores. For example, and as discussed above, items having item scores that are insufficient for inclusion the social search results are not included in the set of items. In some examples, the one or more items can be filtered based on whether the searching user has access and based on the respective items scores.

It is determined whether the search query includes one or more active keywords (304). For example, the search system 114 can cross-reference the terms of the search query with active keywords provided in the active keyword database 124 to determine whether any of the terms matches an active keyword. If the search query does not include one or more active keywords, the items of digital content are provided for display as social search results (306). For example, the search system 114 can include the items of the set of items in the user interface document (e.g., search results web page) that is sent to the client device 104.

If the search query includes one or more active keywords, a first sub-set of items and a second sub-set of items are defined from the set of items (310). For example, the first sub-set of items can include items that are to be included in a discussion stream that is to be displayed in the search results, while the items provided in the second sub-set of items can include items that are to be displayed as social search results in the search results. In some examples, and as discussed in further detail herein, items in the first sub-set of items can include items that are determined to be responsive to the search query and that are relevant to an event underlying the one or more active keywords, while items in the second sub-set of items can include items that are determined to be responsive to the search query, but that are not relevant to the event underlying the one or more active keywords. The first sub-set of items are provided for display in a discussion stream provided in the search results (312), and the second sub-set of items are provided for display as social search results within the search results (314). For example, the search system 114 can include the items of the first and second sub-sets of items in the user interface document (e.g., search results web page) that is sent to the client device 104.

Figure 4A:
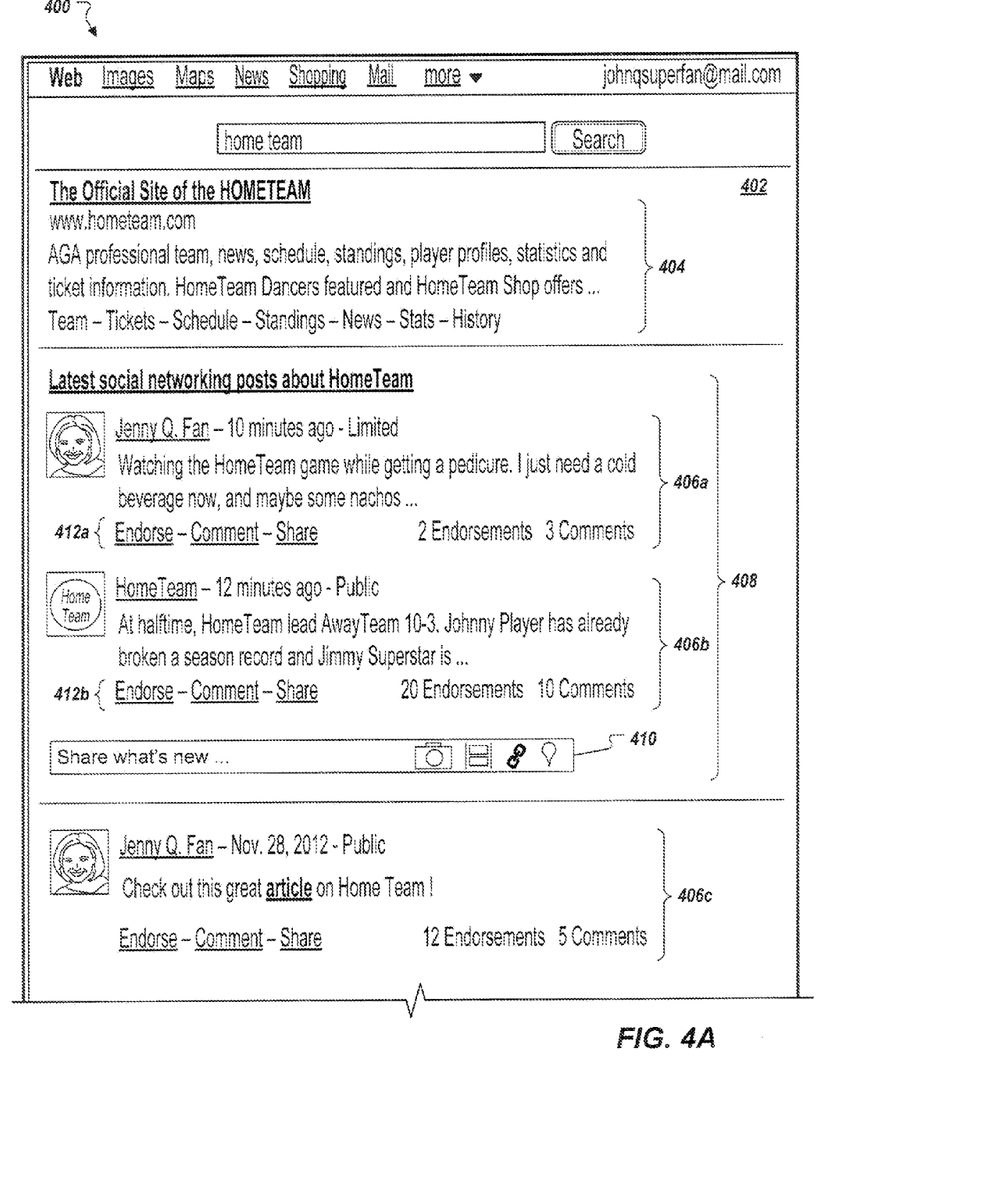
FIG. 4A depicts an example user interface document that includes an example inline social networking service discussion.

FIG. 4A depicts an example user interface document that includes an example inline social networking service discussion. In the example of FIG. 4A, an example search results page 400 is displayed and is associated with a searching user (e.g., "John Q. Superfan") that is logged into a search service. In some examples, the searching user can input user log-in information (e.g., username and password) that can be used to log the user into a search service. In some examples, a user profile can be identified based on the user input and profile data corresponding to the user can be retrieved. In some examples, the user profile data can include a contact index that can be used to identify one or more contacts of the user within one or more social networking services.

The example search results page 400 includes search results 402 that include web search results and social search results. The search results page 400 displays example search results responsive to the example query "home team." In the depicted example, the displayed search results include web search results 404 and social search results provided as items of digital content 406*a*, 406*b*, 406*c*. The web search results 404 are associated with resources (e.g., web pages) that are publicly accessible on the Internet. The items 406*a*, 406*b*, 406*c* each include digital content that has been distributed using one or more social networking services (e.g., social networking posts).

The items 406*a*, 406*b*, 406*c* include user-generated content that is deemed to be relevant to the search query. In the depicted example, the search result 406*a* includes access controlled content provided as a post that is distributed using a social networking service. For example, the author user "Jenny Q. Fan" generated the post and distributed the post to select users as a limited audience. In the depicted example, the distribution for the post is provided as "Limited," indicating that only users selected by the author user are able to access the post. Consequently, "John Q. Superfan" is a member of the limited audience to which the item 406*a* was distributed. In some examples, an item distribution can include a public distribution, such that any user, whether a contact of the author user, is able to access the post (e.g., the items 406*b*, 406*c*).

In the example of FIG. 4A, a discussion stream 408 is provided inline within the search results 402. The discussion stream 408 includes the items 406*a*, 406*b* and a content sharing interface 410. As discussed in further detail herein, the items 406*a*, 406*b* can be determined to be responsive to one or more active keywords provided in the search query and that are relevant to an event. For example, the event can include an ongoing sports match between two sports teams (e.g., Home Team and Away Team). In the depicted example, the item 406*c* is determined to be responsive to the search query, but is not determined to be relevant to the event. Consequently, the item 406*c* is not displayed within the discussion stream 408.

For example, the sports match between Home Team and Away Team can be ongoing at the time that the searching user submits the search query "home team." In response to the search query, the search result 404 is identified as a web search result (e.g., among other not-depicted web search results), and the items 406*a*, 406*b*, 406*c* can be identified as social search results (e.g., among other not-depicted social search results). In the depicted example, it can be determined that the search query "home team" includes one or more active keywords. For example, at some point before, during and/or after the sports match, the search query "home team" can see a spike in popularity at the search service (e.g., as fans submit search queries regarding the team and/or the sports match). In view of the spike in popularity, the name "home team," for example, can be determined to be an active keyword.

In response to determining that the search query includes one or more active keywords, the items 406a, 406b, 406c can be divided into the first sub-set of items and the second sub-set of items. In some examples, the items 406a, 406b can be determined to be relevant to the event based on the time that each was distributed and/or context of the item. For example, each of the items 406a, 406b was posted during the sports match. Consequently, each of the items 406a, 406b can be determined to be relevant to the ongoing sports match. As another example, each of the items 406a, 406b was posted during the sports match and each of the items includes a reference to the sports match. Consequently, each of the items 406a, 406b can be determined to be relevant to the ongoing sports match. On the other hand, the item 406c is not determined to be relevant to the event. For example, the sports match can be occurring on Dec. 4, 2012, while the item 406c was distributed on Nov. 28, 2012. As another example, the sports match can be occurring on Dec. 4, 2012, while the item 406c was distributed on Nov. 28, 2012, and the content of the item 406c does not reference the event. Consequently, it can be determined that, although responsive to the search query, the item 406c is not relevant to the event.

In the example of FIG. 4A, the searching user can interact with the discussion stream 408 and/or the individual items provided in the discussion stream 408. For example, the searching user can use the content sharing interface 410 to generate an item of digital content that can be shared to the discussion stream 408. In this manner, the searching user can contribute to the discussion stream 408. Further, each of the items can include associated interaction elements (e.g., interaction elements 412a, 412b). The searching user can interact (e.g., click on) the interaction elements 412a, 412b to interact with the respective items (e.g., endorse, comment on and/or re-share).

Figure 4B:
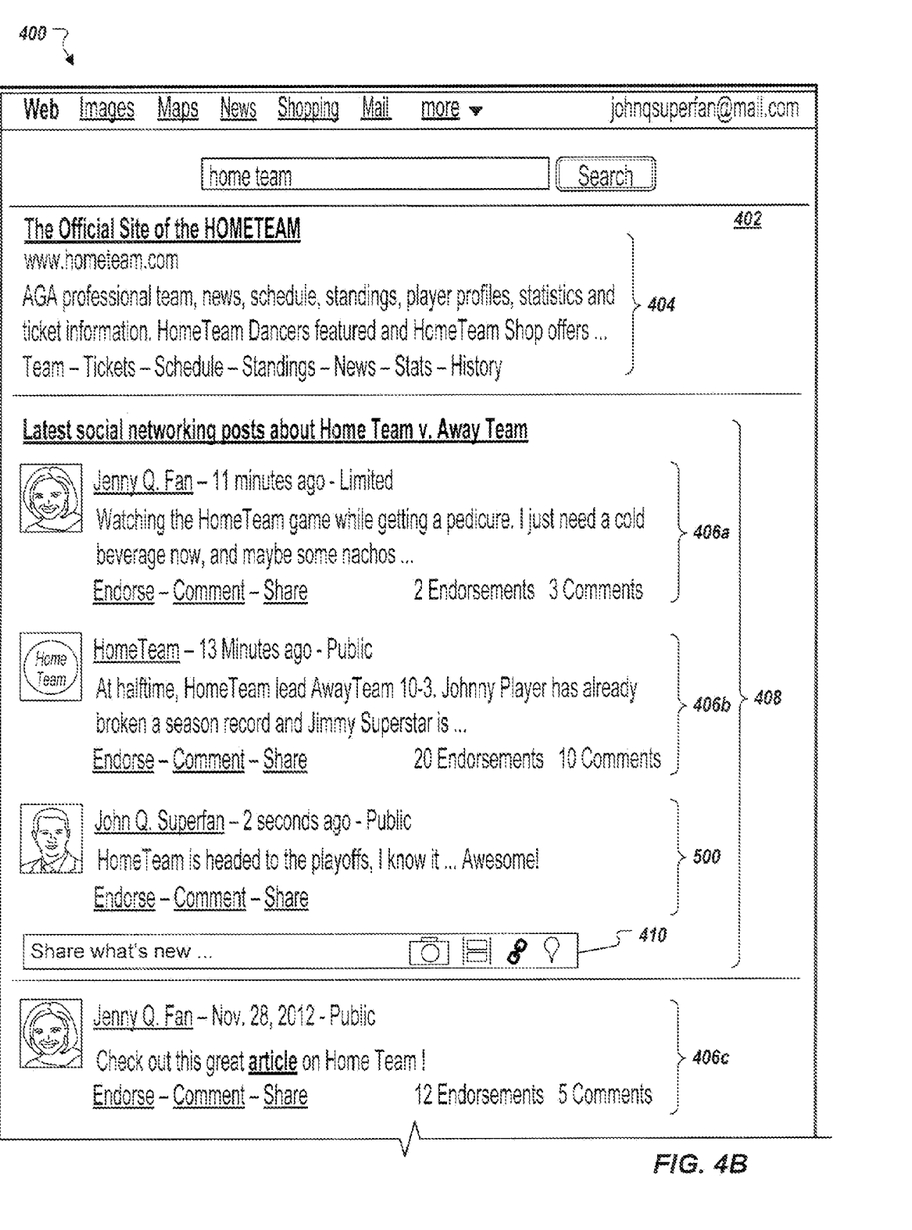
FIG. 4B depicts the example user interface document of FIG. 4A with an update to the example inline social networking service discussion based on user interaction.

FIG. 4B depicts the example user interface document of FIG. 4A with an update to the example inline social networking service discussion based on user interaction. In the example of FIG. 4B, the discussion stream 408 is updated to include an item 500 that was generated by the searching user using the content sharing interface 410 from FIG. 4A.

In some examples, the discussion stream 408 can be updated based on a request sent to the underlying social networking service for an update of items that are responsive to the search query. For example, and in response to interaction of the searching user with the discussion stream 408, a request for an update of items can be sent, updated items can be received, and the updated items can be displayed in the discussion stream 408 (e.g., in place of, or in addition to the previously displayed items). In some examples, the discussion stream 408 can be updated through local execution of one or more scripts based on user interaction with the discussion stream 408 (e.g., the web browser displaying the search results page 400 executes one or more scripts). In some examples, the one or more scripts can be executed to update previously displayed items and/or to include a new item generated by the searching user.

In some implementations, and as discussed above, whether an item of digital content that is responsive to the search query is displayed as a search result can be determined based on an item score associated with the item. In the example of FIGS. 4A and 4B, the item 406a can include an item score that accounts for the fact that the author "Jenny Q. Fan" is a contact of the searching user within the social networking service used to distribute the item 406a. Consequently, although the item 406a is displayed as a social search result to the searching user "John Q. Superfan," the item 406a might not be displayed as a social search result to another searching user (e.g., another searching user that is not as close of a contact of "Jenny Q. Fan" within the social networking service). As another example, the item 500 can include an item score that accounts for the fact that the author "John Q. Superfan" is also the searching user. Consequently, although the item 500 is displayed as a social search result to the searching user "John Q. Superfan," the item 500 might not be displayed as a social search result to another searching user (e.g., another searching user that is not a contact of "John Q. Superfan" within the social networking service). In this manner, discussion streams are specific to the searching user to promote interaction of the searching user with items displayed in the discussion stream. For example, a searching user might be more likely to interact with items and/or contribute to the discussion stream, if the discussion stream includes items distributed by contacts of the searching user and/or the searching user themselves.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions encoded on a computer storage medium for execution by, or to control the operation of, data processing apparatus. Alternatively or in addition, the program instructions can be encoded on a propagated signal that is an artificially generated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method executed using one or more processors, the method comprising:
    receiving a search query from a searching user;
    identifying a plurality of items of digital content distributed using one or more social networking services, each item in the plurality of items being responsive to the search query;
    providing a set of items from the plurality of items to be displayed as social search results based on respective item scores, each item score being specific to a respective item and the searching user, and exceeding a threshold item score; and
    determining that one or more terms provided in the search query is an active keyword, wherein an active keyword is a keyword that has increased in popularity over a pre-defined time period, and, in response:
- determining, from the set of items, an event underlying the active keyword, the event determined from items that are relevant to the event and referencing the event;
- determining a time period during which the event occurred;
- determining times at which each of the items were distributed by the one or more social networking services;
- assigning, to a first sub-set of items, each item that is determined to: (i) be responsive to the active keyword, (ii) be relevant to the event and referencing the event, and (iii) have been distributed using the one or more social networks at a time within the time period during which the event occurred;
- assigning to a second sub-set of items, items that are different than items assigned to the first sub-set of items, and that are determined to: (i) be responsive to the active keyword and (ii) have been distributed using the one or more social networks at a time not within the time period during which the event occurred;
- providing items in the first sub-set of items for display within a set of search results responsive to the search query as social search results in a discussion stream within the set of search results; and
- providing items in the second sub-set of items for display within the set of search results as social search results outside of the discussion stream within the set of search results.

2. The method of claim 1, wherein the set of items is provided from the plurality of items of digital content based on at least one of an access authorization of the searching user with respect to each item of the plurality of items of digital content and the respective item scores associated with items of the plurality of items of digital content.

3. The method of claim 2, wherein each item score is specific to the searching user such that items included in the set of items are potentially more relevant to the searching user than other items provided in the plurality of items of digital content.

4. The method of claim 2, wherein the searching user comprises a user that submitted the search query.

5. The method of claim 1, wherein providing items in the first sub-set of items for display comprises sending a user interface document, the user interface document comprising instructions to display the items of the first sub-set of items as the discussion stream.

6. The method of claim 5, wherein the user interface document comprises a web page.

7. The method of claim 1, further comprising providing a content sharing interface within the discussion stream, the content sharing interface enabling a searching user to contribute items of digital content to the discussion stream.

8. The method of claim 7, further comprising:
- receiving an item of digital content authored by the searching user using the content sharing interface;
- including the item of digital content in the first sub-set of items; and
- updating the search results such that the item of digital content is displayed in the discussion stream.

9. The method of claim 1, wherein determining that one or more terms provided in the search query is an active keyword comprises:
- comparing each term of the one or more terms to a plurality of active keywords provided in an active keyword database, the plurality of active keywords including the active keyword; and
- determining that a term of the one or more terms matches the active keyword.

10. The method of claim 1, further comprising:
- identifying a second plurality of social search results that are responsive to a second search query received from the searching user, the second plurality of social search results comprising a second plurality of items of digital content distributed using one or more social networking services; and
- determining that the second search query is absent an active keyword, and, in response, providing items in the second plurality of items for display as social search results within search results.

11. A system comprising:
- one or more computer processors; and
- one or more non-transitory computer readable devices that include instructions that, when executed by the one or more computer processors, causes the processors to perform operations, the operations comprising:
- receiving a search query from a searching user;
- identifying a plurality of items of digital content distributed using one or more social networking services, each item in the plurality of items being responsive to the search query;
- providing a set of items from the plurality of items to be displayed as social search results based on respective item scores, each item score being specific to a respective item and the searching user, and exceeding a threshold item score; and
- determining that one or more terms provided in the search query is an active keyword, wherein an active keyword is a keyword that has increased in popularity over a pre-defined time period, and, in response:
  - determining, from the set of items, an event underlying the active keyword, the event determined from items that are relevant to the event and referencing the event;
  - determining a time period during which the event occurred;
  - determining times at which each of the items were distributed by the one or more social networking services;
  - assigning to a first sub-set of items each item that is determined to: (i) be responsive to the active keyword, (ii) be relevant to the event and referencing the event, and (iii) have been distributed using the one or more social networks at a time within the time period during which the event occurred;
  - assigning to a second sub-set of items, items that are different than items assigned to the first sub-set of items, and that are determined to: (i) be responsive to the active keyword and (ii) have been distributed using the one or more social networks at a time not within the time period during which the event occurred;
  - providing items in the first sub-set of items for display within a set of search results responsive to the search query as social search results in a discussion stream within the set of search results; and
  - providing items in the second sub-set of items for display within the set of search results as social search results outside of the discussion stream within the set of search results.

12. The system of claim 11, wherein the set of items is provided from the plurality of items of digital content based on at least one of an access authorization of the searching user with respect to each item of the plurality of items of digital content and the respective item scores associated with items of the plurality of items of digital content.

13. A non-transitory computer storage medium encoded with one or more computer programs, the one or more computer programs comprising instructions that when executed by data processing apparatus cause the data processing apparatus to perform operations comprising:

receiving a search query from a searching user;

identifying a plurality of items of digital content distributed using one or more social networking services, each item in the plurality of items being responsive to the search query;

providing a set of items from the plurality of items to be displayed as social search results based on respective item scores, each item score being specific to a respective item and the searching user, and exceeding a threshold item score; and determining that one or more terms provided in the search query is an active keyword, wherein an active keyword is a keyword that has increased in popularity over a pre-defined time period, and, in response:

determining, from the set of items, an event underlying the active keyword, the event determined from items that are relevant to the event and referencing the event;

determining a time period during which the event occurred;

determining times at which each of the items were distributed by the one or more social networking services;

assigning to a first sub-set of items each item that is determined to: (i) be responsive to the active keyword, (ii) be relevant to the event and referencing the event, and (iii) have been distributed using the one or more social networks at a time within the time period during which the event occurred;

assigning to a second sub-set of items, items that are different than items assigned to the first sub-set of items, and that are determined to: (i) be responsive to the active keyword and (ii) have been distributed using the one or more social networks at a time not within the time period during which the event occurred;

providing items in the first sub-set of items for display within a set of search results responsive to the search query as social search results in a discussion stream within the set of search results; and providing items in the second sub-set of items for display within the set of search results as social search results outside of the discussion stream within the set of search results.

14. The computer storage medium of claim 13, wherein the set of items is provided from the plurality of items of digital content based on at least one of an access authorization of the searching user with respect to each item of the plurality of items of digital content and the respective item scores associated with items of the plurality of items of digital content.

* * * * *